United States Patent [19]
Cromwell et al.

[11] 3,936,295
[45] Feb. 3, 1976

[54] BEARING MEMBERS HAVING COATED WEAR SURFACES

[75] Inventors: John Edward Cromwell, Baltimore; Glenn Francis Hyde, Timonium, both of Md.

[73] Assignee: Koppers Company, Inc., Pittsburgh, Pa.

[22] Filed: Feb. 15, 1974

[21] Appl. No.: 443,080

Related U.S. Application Data

[63] Continuation-in-part of Ser. No. 322,482, Jan. 10, 1973, abandoned.

[52] U.S. Cl. ............... 75/0.5 R; 29/191.2; 29/195; 277/235 R; 277/216; 427/34
[51] Int. Cl.$^2$ ................... C23C 7/00; B22F 1/02
[58] Field of Search ...... 29/195 A, 198, 191, 191.2; 277/235, 224; 117/105, 93.1 PF; 75/0.5 R

[56] References Cited
UNITED STATES PATENTS

| | | | |
|---|---|---|---|
| 3,539,192 | 11/1970 | Prasse | 277/224 |
| 3,556,747 | 1/1971 | Hyde et al. | 29/198 |
| 3,606,359 | 9/1971 | McCormick | 277/224 |
| 3,615,099 | 10/1971 | Prasse | 277/235 A |
| 3,837,817 | 9/1974 | Nakamura | 29/195 |

*Primary Examiner*—L. Dewayne Rutledge
*Assistant Examiner*—E. L. Weise
*Attorney, Agent, or Firm*—Oscar B. Brumback; Boyce C. Dent

[57] ABSTRACT

The invention comprises bearing members having a coated wear surface applied by plasma-spraying an aggregate of particles thereon consisting of nickel-aluminum particles, nickel-molybdenum particles, tungsten carbide particles, and intermetallic alloy particles to form a high temperature, oxidation resistant, wear resistant, and scuff resistant coating. Alloying of the constituents in the final coating is desired and is achieved by encapsulating both the aluminum and molybdenum particles with nickel (alternatively the nickel-aluminum may be in the form of a bonded aggregate), by sintering the tungsten carbide in a matrix of cobalt, and by alloying nickel-cobalt, carbon, silicon, chromium, boron, and iron into an intermetallic alloy to form an aggregate of four types of particles for plasma-spraying onto the wear surface.

10 Claims, 4 Drawing Figures

U.S. Patent  February 3, 1976  3,936,295
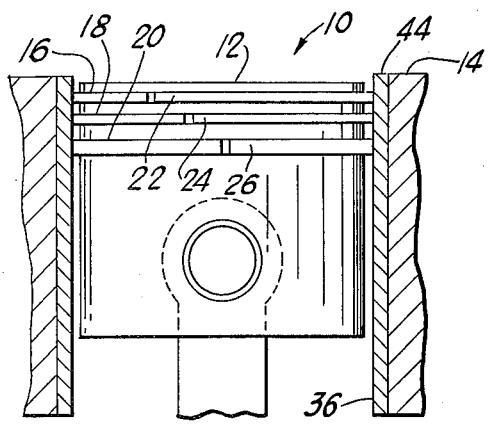
FIG. 1
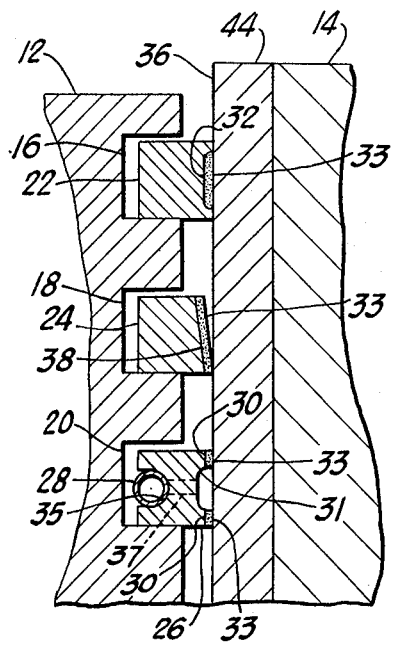
FIG. 2
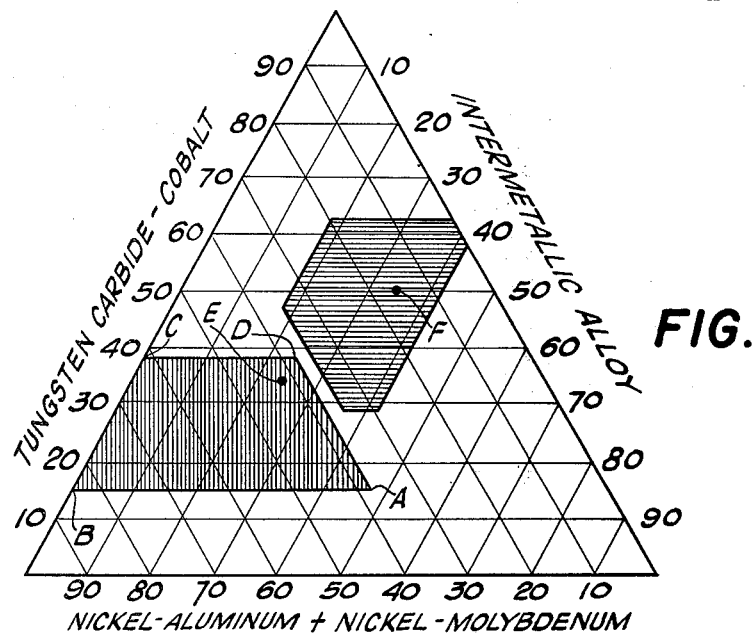
FIG. 3
| MATERIAL | A | B | C | D | PREFERRED |
|---|---|---|---|---|---|
| NI-AL | 10.5-0 | 10.5-0 | 10.5-0 | 10.5-0 | 10.5 |
| NI-MO | 26.7-37.2 | 74.5-85.0 | 50.5-61.0 | 26.7-37.2 | 30.0 |
| WC-CO | 15.0-15.0 | 15.0-15.0 | 39.0-39.0 | 39.0-39.0 | 35.0 |
| INTERMET. | 47.8-47.8 | 0-0 | 0-0 | 23.8-23.8 | 24.5 |
FIG. 4

BEARING MEMBERS HAVING COATED WEAR SURFACES

CROSS REFERENCES TO RELATED APPLICATIONS

This is a continuation-in-part of application Ser. No. 322,482, now abandoned, filed Jan. 10, 1973, by Glenn F. Hyde and John E. Cromwell for Molybdenum-tungsten Carbide Coated Bearing Members and assigned to the assignee of the present invention.

BACKGROUND OF THE INVENTION

1. Field of the Invention:

This invention relates generally to bearing members such as piston rings, packing rings, and valves and, more particularly to the bearing faces of such members having a high temperature, oxidation-resistant, wear-resistant and scuff-resistant coating thereon applied by plasma-spraying a particle composition onto such bearing faces.

2. Description of the Prior Art:

In internal combustion engines, each piston usually has a plurality of compression rings and oil control rings in grooves located on the side face of the piston which bear against the cylinder wall of the engine to provide a seal between the piston and the cylinder wall. Failure of the piston rings to properly seal the piston and the cylinder results in leakage between the rings and the cylinder thereby causing low engine compression, bad ignition, incomplete combustion and accelerated erosion of the piston rings and cylinder wall. Because the piston rings reciprocate at high speeds against the cylinder walls at high operating temperatures, the rubbing surfaces tend to wear rapidly. Accordingly, many attempts have been made to develop coatings for the wear surfaces on the piston rings and cylinder walls that can extend their life.

Many flame-sprayable compositions have been developed for coating such wear surfaces. For example, one composition includes commercially pure elemental molybdenum as one constituent of the coating such as shown in Hyde et al. Pat. No. 3,556,747. Such coatings have improved the wear resistance of piston rings that operate at relatively low temperatures but, at elevated operating surface temperatures, the elemental molybdenum apparently oxidizes and forms molybdenum oxides at a threshold temperature of about 450° Fahrenheit. These oxides seem to migrate to the grain boundaries of the molybdenum coating causing the cohesive strength of the coating to decrease and eventually results in flaking of the coating from the piston ring or other wear surfaces to which it is applied.

Other refractory metals such as molybdenum, chromium, and tungsten carbides have been used such as shown in Prasse Pat. No. 3,539,192 and McCormick Pat. No. 3,606,359. While these carbide coatings have made the piston rings more wear resistant, it has been discovered that they are often too abrasive and tend to induce engine cylinder wear and usually have insufficient mechanical strength to withstand the high speed and high temperatures in modern engines. In fact, this problem has been recognized by McCormick in Pat. No. 3,606,359. McCormick states that metal carbide coatings carry sharp-edged or globular particles that pull out of the coating in operation in the engine causing excessive wear of the piston rings and cylinders. McCormick attacked this particular problem by placing the carbides in solution with cobalt. He also believed that if the amount of aluminum in the coating is less than 1% by weight, the problem of "scuffing" would be avoided.

Scuffing occurs when the coating has an adhesive affinity for the wall of the engine cylinder. The coating on the piston ring contacts the bearing face of the adjacent member through minute asperities. Since the areas of actual contact are so small, plastic flow occurs and the two surfaces become cold welded. Relative motion between the surfaces shears the welded junctions and generates loose particles of debris which contribute to the scuffing of the cylinder wall or other adjacent member.

Although coatings comprised of or containing elemental molybdenum are usually scuff-resistant at low temperatures, high frictional surface temperatures in excess of 1000° F are now present in some newer engines; thus, more scuff-resistant and oxidation-resistant coatings are now needed such as provided by the use of more oxidation-resistant carbides and alloys of this invention.

In U.S. Pat. 3,615,099, Prasse proposes the use of multiple layers of flame-sprayed compositions and specifically the use of an outer layer of elemental molybdenum and an inner layer of a more refractory material such as a tungsten carbide alloy. Yet, Prasse recognizes that the outer molybdenum layer will not last long and uses it specifically as a break-in layer that shortly wears away after a new piston ring has been broken in. After the outer molybdenum layer vanishes, the more refractory layer of a tungsten carbide alloy becomes the effective seal.

The coatings described in the foregoing patents generally share one thing in common; they all use an intermetallic alloy as the starting material which serves as a bonding agent in the final coating. To this alloy are added specific amounts of other materials in an attempt to capture the beneficial characteristics of the added materials.

From this it might be theorized that one has only to add those materials possessing the desired characteristics to produce an improved coating.

Unfortunately, the synergistic qualities desired in the coating cannot be predetermined by formulas, rules, or knowledge of the characteristics of the individual materials used. If this could be done, then it would only be necessary to select materials having the desired characteristics and combine them to achieve a coating having all of the desired qualities. Obviously, this cannot be done; otherwise an ultimate coating would have been developed long ago. As it is, only inventive effort succeeds in achieving the desired result because of the complex interaction of various materials when subjected to the intense heat of the plasma flame and only testing proves the results of the inventive effort.

In addition, those working in the prior art have not recognized the importance of preparing the starting material such that substantial alloying of the materials occurs in the final coating, except that it has been recognized that tungsten carbide should be alloyed with cobalt to form one constituent of the starting material.

We have discovered that the wear-resistance and scuff-resistance of a coating can be greatly improved by alloying molybdenum with tungsten carbide, nickel, and aluminum in the final coating, especially for use where surface temperatures in excess of 1000°F occur in an internal combustion engine or other apparatus in which the coating is used and that it improves adhesion of the coating to the underlying ferrous body, improves the cohesive strength of the coating itself, and improves the anti-welding properties of the coating.

We have also discovered that alloying of the materials in the final coating can best be achieved by properly preparing the aggregate to be sprayed. Doing so prevents the aluminum constituent from buring up in the plasma flame, prevents oxidation of and preserves the scuff-resistant properties of the molybdenum, enables the formation of nickel-molybdenum alloys, and permits the tungsten carbide to at least partially if not completely alloy with the other materials in the coating.

SUMMARY OF THE INVENTION

In accordance with the invention, an aggregate of particles is prepared for plasma-spraying onto the wear surface of a bearing member such that the final coating comprises an alloy consisting principally of nickel, aluminum, tungsten carbide, and molybdenum. To achieve alloying of these materials, the composition to be sprayed is prepared as a loose aggregate (hereinafter called "starting aggregate") including four types of particles of which the first is either a bonded aggregate of nickel and aluminum particles or preferably, aluminum particles encapsulated in nickel, and which preferably comprises 10.5% of the weight of the starting aggregate; the second being molybdenum particles encapsulated in nickel and which preferably comprises 30.0% of the weight of the aggregate; the third being a sintered matrix of cobalt containing particles of tungsten carbide and preferably comprising 35.0% of the weight of the aggregate; and, the fourth being an intermetallic alloy including principally nickel with lesser quantities of cobalt, carbon, silicon, chromium, boron, and iron and preferably comprising 24.5% of the aggregate.

BRIEF DESCRIPTION OF THE DRAWINGS

In the drawings wherein like parts are marked alike:

FIG. 1 is a sectional view of a cylinder with a piston carrying piston rings therein;

FIG. 2 is an enlarged view of a portion of the cylinder, piston, and piston rings of FIG. 1;

FIG. 3 is a phase diagram illustrating the maximum percent weight ranges of the constituents of the aggregate composition in comparison with the ranges of similar elements found in compositions of the prior art; and FIG. 4 is a table setting forth the ranges of the constituents of the aggregate composition within the boundaries of points A, B, C, and D of FIG. 3 and the preferred percentages of point E.

DESCRIPTION OF THE PREFERRED EMBODIMENT

FIG. 1 illustrates a typical internal combustion engine piston assembly operating in an engine cylinder generally denoted by numeral 10. Assembly 10 includes a piston 12 within a cylinder 14; the piston includes three grooves 16, 18, and 20 in which are placed rings 22, 24, and 26 respectively. The top ring 22 is a split compression ring; the second ring 24 is a split intermediate compression ring having a tapered face; and, the third ring 26 is a split wide channel oil control ring expanded outwardly by a garter spring 28.

The rings shown in FIG. 1 are shown in greater detail in the enlarged view of FIG. 2. The top compression ring 22 is usually made of ductile cast iron and includes a groove 32 in which is deposited coating 33 of this invention to form a wear face on the ring in contact with the cylinder bore 36.

The second ring 24 is also usually made of ductile cast iron and includes a tapered face 38 as shown in FIG. 2 on which is deposited the coating 33 of this invention to form a bearing or wear face thereon.

The third ring 26 is also usually made of ductile cast iron and includes two spaced wear surfaces or lands 30 formed by a groove 31 cut in the face of the ring. The coating 33 of this invention may also be deposited on lands 30 to provide wear surfaces thereon. An arcuate groove 35 in the inner periphery of the ring provides a seat for the conventional garter spring expander ring 28 which urges the lands 30 into contact with the cylinder bore 36. Ring 26 usually includes a plurality of radially extending holes spaced circumferentially around the ring between outer groove 31 and inner groove 35; these holes permit oil to drain from groove 31.

Thus, it can be seen that the bearing faces of these conventional compression and oil control rings may be coated with the coating 33 of this invention. The bearing faces slidably engage the bore 36 of the engine cylinder 14 and the rings are compressed therein in accordance with usual practice so as to be expanded tightly against the bore 36 to maintain good sealing engagement therewith.

Piston rings of different designs and of different cross-sectional configurations may be coated with the composition of this invention such as, for example, rectangular flat-faced rings with or without grooves or keystone piston rings with or without grooves. The faces of the piston ring not in contact with the cylinder walls may also be coated with the composition although it is not usually necessary to do so.

The engine cylinder 14 preferably includes a cylinder liner 44 that is made from a gray iron casting having a carbon content of about 3.0 to 3.5 percent by weight, a silicon content of about 1.8 to 2.2 percent by weight, a manganese content of about 0.6 to 1.0 percent by weight and a maximum sulfur content of about 0.15 percent by weight and a maximum phosphorus content of about 0.50 percent by weight. Such typical gray iron compositions for use as liners in engine cylinders are designated as SAE G-3500 and G-4500 materials.

The starting aggregate is applied to the piston rings to be coated by well-known and conventional flame-spray techniques using a plasma arc gun. The plasma flame of such a gun produces temperatures of approximately 32,000° Fahrenheit achieved by applying electrical energy to a gas mixture (such as, for example, a ten to one nitrogen to hydrogen mixture) which causes the gas molecules of the mixture to dissociate into an atomic state. The gases are then ionized, producing electrons and charged ions. The electrical energy absorbed by such ionization is converted to heat energy by de-ionization of the gas. The aggregate is directed into the plasma flame by a carrier gas such as, for example, nitrogen. The particles of the aggregate are propelled by the gas escaping through the nozzle of the gun as a stream of molten particles. The nozzle is aimed at the surface to be coated so that the molten particles impinge thereon. The molten particles solidify to provide a continuous, adherent coating on the surface that results from a combination of mechanical and atomic bonding at the interface of the coating and the substrate body and between the particles themselves to form an alloy of the constituents of the starting aggregate.

In accordance with the invention, the material to be sprayed generally comprises a loose aggregate of thoroughly mixed finely divided particles of the required physical composition. The aggregate contains particles of particular amounts by weight of nickel-aluminum, tungsten carbide, nickel-molybdenum, and an intermetallic alloy consisting principally of nickel. Advantageously, the aggregate can be blended from commercially available flame-sprayable particles or powders as will be discussed in greater detail. The diameter of the particles may vary from 5 to 100 microns but the preferred diameter is 15 to 44 microns, it being understood that the particles are not perfectly spherical. The particle size distribution of the aggregate can be readily ascertained by screening the particles in accordance with ASTM Test B214. The various particles should have the general overall shape and configuration of conventional flame-sprayable compositions and should be as uniform in diameter as possible.

If the diameter of the particles is less than 5 microns, then vaporization of these particles readily occurs in the plasma flame and consequently the final coating may not contain the desired amount of a particular material. On the other hand, if the diameter of the particles is greater than 100 microns, then the particles may not readily melt during the short time they are in the plasma flame so that the desired alloying of all the particles does not occur. Unalloyed particles may pull from the coating in use and cause abrasion.

As previously mentioned, the aggregate to be sprayed contains particles of nickel-aluminum, nickel-molybdenum, tungsten carbide, and an intermetallic alloy consisting principally of nickel. It is believed that the final coating is essentially a nickel, molybdenum, tungsten carbide-cobalt alloy wherein the tungsten carbide-cobalt alloy ingredient, if not completely alloyed with the other materials, is at least bound in a fused and alloyed matrix of molybdenum, nickel and chromium. The coating has a hard phase randomly dispersed throughout several softer phases; the hard phase consists of tungsten carbides in solid solution with cobalt and of a solid solution of tungsten and carbon; one of the softer phases consists of an alloy of nickel, chromium, silicon and boron and the other softer phase consists of an alloy of nickel and molybdenum. The starting aggregate is preferably prepared as a blend of four commercially available flame-sprayable constituents. The first constituent is a nickel-molybdenum clad power composition in which each particle comprises a molybdenum core encapsulated in nickel. Such clad particles are commercially available from Koppers Company, Inc. under the trademark K-1020 and are the subject of pending patent application Ser. No. 41,038 filed by John E. Cromwell on May 27, 1970, which application is assigned to the assignee of the present invention. The composition of these particles is 40.0 – 60.0 percent by weight of elemental nickel with the preferred percentages being 55 percent molybdenum and the balance 45 percent nickel. The typical size range of the particles is from 15 to 88 microns in diameter.

The cross section of a typical particle of this component illustrates a distinctive shell of commercially pure nickel surrounding a particle of commercially pure molybdenum. The nickel shell constitutes from about 5–10 percent of the diameter of the molybdenum particle. After the particles pass through the plasma gun, the cross section of a particle illustrates a composition that ranges from commercially pure nickel at the surface to a commercially pure molybdenum at the center. Between the surface and the center of the particle various alloys of nickel and molybdenum appear such as $Ni_4MO$ and $Ni_3Mo$ and $NiMo$. It is believed that the reason a variable composition appears from the surface to the center of the particle is that, when the particles are flame-sprayed or are heated above their melting point of about 2400° Fahrenheit, a partial alloying occurs during the residence period of the particle in the gun and its flight time from the gun to the piston ring.

The second constituent of the aggregate is a tungsten carbide-cobalt aggregate powder composition in which each particle comprises tungsten carbide particles having a diameter of 3–5 microns dispersed through a matrix of elemental cobalt. The tungsten carbide-cobalt particles may be made by mixing particles of tungsten carbide with particles of cobalt in a liquid phenolic resin binder which, after hardening, is ground to form the composite particles of tungsten carbide-cobalt. However, the particles are preferably made by mixing the tungsten carbide and cobalt particles into a mass which is then sintered to form what may be called a welded connection between the particles. Thereafter, the mass is ground into fine particles ranging in size from 15 to 44 microns in diameter. The particles appear as particles of tungsten carbide dispersed in a matrix of cobalt with the tungsten carbide comprising about 88.0 percent by weight and the cobalt comprising about 12.0 percent by weight. This second constituent is commercially available and may be obtained from a number of sources such as, for example, Avco Bay State Abrasive Division of Industrial Products Subdivision or Refractory Metal Inc.

The third constituent of the aggregate is essentially a nickel-chromium-silicon alloy powder in which each particle has the following chemistry in percent by weight:

| | |
|---|---|
| CARBON | 0.60 – 1.30% |
| SILICON | 3.00 – 5.00% |
| CHROMIUM | 13.00 – 20.00% |
| NICKEL-COBALT | 63.90 – 77.60% |
| (Cobalt | Less Than 1.00%) |
| IRON | 3.00 – 5.00% |
| BORON | 2.75 – 4.75% |

These individual materials are mixed and then melted to form a complete alloying of the materials, the alloy then being processed to form particles ranging from 15 to 53 microns in diameter with a cross section of a typical particle being spherical. The composition has a melting point of approximately 1875° Fahrenheit. When it alone is flame sprayed onto a metal substrate, the resultant coating has essentially the same composition as the constituent powder and it forms a dense, hard, and corrosion-resistant coating. This third constituent is readily commercially available and may be obtained from a number of commercial sources including the above-named sources.

The fourth constituent of the aggregate is essentially a nickel-aluminum composition. There are two types of commercially available powders that may be used, one being referred to as a nickel-aluminide composition and the other being referred to as a nickel-aluminum bonded aggregate. The nickel-aluminide composition has a typical particle size range of 53 to 88 microns in diameter. The cross section of a typical particle exhibits a commercially pure elemental aluminum core with commercially pure elemental nickel uniformly surrounding the aluminum particle. The composition of the nickel-aluminide composition is 18–22 percent by weight of aluminum and a balance of 82–78 percent by weight of nickel. This material is available from Metco Company and is sold under the tradename of Metco 404NS. It is an exothermic material and liberates heat upon being melted in the plasma flame thus creating a superior metallurgical bond of the material to the metal substrate. It is also synergistic because it creates a better combination of nickel and aluminum than can be created in any other way.

The other nickel-aluminum composition is a physical admixture of particles of commercially pure elemental aluminum and elemental nickel held together by a phenolic resin and may be referred to as a bonded aggregate. The particles range in size from 44–88 microns in diameter. The composition of the bonded aggregate is 4.5 percent by weight of aluminum and a balance of 95.5 percent by weight of nickel. This particular composite provides a good overall flame-sprayable material but has a smaller aluminum content as compared to the nickel-aluminide composition of nickel encapsulated aluminum. This composition is commercially available from Metco Company and is sold under the tradename of Metco 450.

These four constituents are blended together in a conventional blender in selected weight ratios to form the starting aggregate for spraying onto the wear surface to be coated. The following table sets forth the minimum, preferred, and maximum amounts of the four constituents by weight in the starting aggregate that is sprayed to produce the desired coating.

| | BLENDS (PERCENT BY WEIGHT) | | |
|---|---|---|---|
| 1ST CONSTITUENT - NI-MO PARTICLES | 26.7 | 30.0 | 85.0 |
| 2ND CONSTITUENT - WC-CO PARTICLES | 15.0 | 35.0 | 39.0 |
| 3RD CONSTITUENT - INTERMETALLIC ALLOY PARTICLES | 0 | 24.5 | 47.8 |
| 4TH CONSTITUENT - NICKEL-ALUMINUM PARTICLES | 0 | 10.5 | 10.5 |

The starting aggregate may be manufactured or blended from other commercially available composite powders so long as the constituents are formed as previously described; the foregoing being an illustration of the manner in which the flame-sprayable aggregate of our invention may be derived from commerically available materials. The minimum and maximum weight limits of the flame-sprayable constituents are the critical limits of the aggregate.

We have also found that the oxygen content of the aggregate should not exceed 0.15 percent by weight as oxides in the aggregate tend to lower the cohesive strength of the coating on the wear surfaces to which it is applied.

As previously mentioned, the maximum amount of molybdenum in the nickel-molybdenum constituent of the aggregate is 60 percent by weight. When the molybdenum content exceeds this amount, it is believed that when the final coating is exposed to the high temperatures generated by the environment to which the piston ring is exposed, deleterious molybdenum oxides are formed that eventually migrate to the grain boundaries of the flame-sprayed coating and thereby weaken the cohesive strength of the coating. Consequently, the coating on the piston ring will fall apart in use and such problems as scuffing will occur.

We have also found that the presence of molybdenum in the final coating improves and aids the adhesion of the coating to the underlying metal substrate and that the molybdenum improves the wear characteristics of the coating. When the amount of molybdenum in the nickel-molybdenum constituent of the starting aggregate is less than 40.0 percent by weight, then the final coating has an inferior adhesion to the substrate. Moreover, this minimum amount of molybdenum improves the cohesive strength of the coating itself because it, at least partially, is alloyed to the other materials in the coating. The molybdenum also serves as a metallic lubricant and has excellent anti-welding properties because the melting temperature of molybdenum is 4730° Fahrenheit. The anti-welding properties of molybdenum prevent adhesive wear in cases where metal contact is encountered in marginal conditions lubrication which oftentimes exist in an internal combustion engine. However, oxides of molybdenum do not alloy well with other materials and are also abrasive when present in the final coating. In accordance with this invention, oxidation of the pure molybdenum particles is minimized during plasma spraying since they are encapsulated in an elemental commercially pure nickel shell as previously described. We have also found that the use of molybdenum carbide in place of the nickel encapsulated molybdenum produces a coating inferior to that of the invention.

Similarly, encapsulation of the aluminum particles is preferred over a bonded nickel-aluminum aggregate constituent since the nickel capsule protects the aluminum during plasma spraying, preventing the aluminum from being completely burned up during the spraying process. The proportions selected for the nickel and aluminum result in an alloying of the nickel and aluminum and an alloying of both to the other materials in the final coating and to the ring body.

Before coating the bearing surface of the piston ring with the composition of this invention, the surface is preconditioned by well-known techniques. Typical preconditioning includes degreasing and grit blasting the surface to roughen it.

In the process of our invention, the piston rings are conventionally stacked on an arbor with their side faces tightly pressed against each other and with the outer or bearing surfaces fully exposed. The bearing surfaces are coated by using a plasma jet gun. The starting aggregate is sprayed on the ring to the desired thickness of the coating. The coating thickness depends on the geometry of the part to be coated and the type of finish required. However, a coating of approximately 0.012 inches to 0.020 inches in thickness is usually applied. Subsequently, the coating is ground by conventional grinding techniques to a thickness of about 0.006 to 0.008 inches. In some cases the coating is crowned about 0.0002 to 0.0006 inches in the conventional manner. The resultant coating is hard and adheres tenaciously to the bearing surface of the piston ring. The ring is then ready for use in a conventional manner in an internal combustion engine.

As mentioned, the coating made in accordance with this invention is superior to the coatings of the prior art. The reason for this is not clearly known; however, it is believed that the coating is heterogeneous. Apparently, there is a distribution of alloyed or partially components in the coating each of which serves a distinct function. The particles that do not completely alloy with other materials are at least held together by partial alloying with each other and with the other materials.

For example, resistance to abrasive wear is attributable to the presence of hard components in the coating. These components are mostly tungsten carbides in solid solution with cobalt. Typical alloys of tungsten carbides and cobalt have a hardness of about 74 Rockwell Scale C. The alloy as found in the final coating normally appears in platelet form without sharp edges with the platelets being aligned substantially parallel with the substrate to which they are applied. It is believed that the alignment results from the molten state of the particles in the plasma stream flattening out upon impact with the substrate similar to a water droplet falling upon a flat surface. Some of the softer alloys in the coating contain chromium, nickel, silicon, and boron in an alloy form. Typical alloys of such elements have a hardness of about 53 Rockwell Scale C and also usually appear in platelet form without sharp edges.

The coating also contains alloys of molybdenum and nickel. Typical alloys of such elements have a hardness of about 34–47 Rockwell Scale C. The nickel component of these alloys resists oxidation and protects the molybdenum component which is susceptible to oxidation. The molybdenum component of the alloys resists welding and prevents such problems as scuffing. It is also believed that the molybdenum supplies a very thin smear layer of atomic dimensions over the coating itself and thereby enhances the coating's resistance to scuffing.

From a corrosive wear viewpoint, the tungsten carbides also resist acid corrosion as well as do chromium, nickel and silicon. Another desirable feature of the coating is its porosity which is sufficient to absorb and hold oils. As the coating is heated, the absorbed oil in the coating expands and exudes to the surface of the coating to provide lubrication.

As already explained, it is not only important for the starting aggregate to contain the desired materials but also the have them in particular form to achieve the desired characteristic in the final coating. Nevertheless, it can be seen that the starting aggregate will contain total amounts of some materials even though portions of the same materials will be in different forms. For example, nickel is used to encapsulate both the aluminum and the molybdenum and is also found in the intermetallic alloy. For the sake of completeness, the total amounts of individual materials in the starting aggregate are set forth in the following table which shows the minimum and maximum amounts thereof in weight percent.

|  | MINIMUM | MAXIMUM |
| --- | --- | --- |
| NICKEL | 10.7 | 96.5 |
| ALUMINUM | 0 | 2.1 |
| MOLYBDENUM | 10.7 | 51.0 |
| TUNGSTEN CARBIDE | 12.9 | 35.1 |
| COBALT | 1.5 | 5.5 |
| CARBON | 0 | .6 |
| CHROMIUM | 0 | 9.6 |
| BORON | 0 | 2.3 |
| IRON | 0 | 2.4 |

However, the minimum and maximum weight percent ranges of the four constituents of the aggregate are better illustrated in the phase diagram of FIG. 3. For purposes of illustration, the amounts of nickel-aluminum and nickel-molybdenum have been combined and are represented by the scale on the lower side of the diagram; the individual amounts are shown in the table of FIG. 4. The tungsten carbide-cobalt content of the aggregate is represented by the scale on the left side of the diagram and the intermetallic alloy content is represented by the scale on the right side of the diagram. The maximum limits of these materials in the starting aggregate is illustrated by the vertically-shaded portion of the phase diagram. The four corners of the shaded portion are identified by letters A, B, C, and D which correspond to columns A, B, C, and D of the table of FIG. 4. The preferred weight percent of these constituents in the aggregate is set forth in the last column of FIG. 4 and is graphically illustrated by the small circle denoted E in FIG. 3.

For the sake of comparison, the maximum amounts of nickel-aluminum and nickel-molybdenum, tungsten carbide-cobalt, and intermetallic alloy used in the prior art are illustrated by the horizontally-shaded portion of the diagram with the preferred amounts being illustrated by the small circle denoted F. But, it should be understood that these materials in the prior art are not all in the same form as they are in the starting aggregate of the invention.

Although it can be seen that there is an overlap in the amounts of tungsten carbide-cobalt and intermetallic alloy that are used both in the starting aggregate and in the prior art, there is no overlap in the amounts of nickel-aluminum and nickel-molybdenum that are used. This difference is content alone results in a significantly improved final coating. But, it should also be recognized that other differences also contribute to improvement of the coating. For example, the coatings described in Hyde et al. 3,556,747 and Prasse 3,615,099 both utilize particles of bare molybdenum whereas this invention utilizes particles of molybdenum encapsulated in a shell of nickel which preserves the scuff-resistant properties of the molybdenum itself and also results in alloys of nickel and molybdenum which also enhances the wear properties of the coating. It is believed that the residence time in the plasma flame is too short to result in alloying reactions between merely blended particles of nickel and molybdenum; thus, the molybdenum oxidizes and the beneficial properties of the molybdenum and nickel-molybdenum alloys are lost in blends of such particles whereas the beneficial properties are preserved by encapsulating the molybdenum with nickel.

The final coating is also improved by the use of nickel encapsulated molybdenum rather than the use of molybdenum carbides such as described in Prasse 3,539,192 and McCormick 3,606,359. The reason is believed to be that molybdenum carbides break down under temperatures generated by sliding friction and form oxides of molydenum which are very abrasive thus causing excessive wear on the mating part. And, it should be appreciated that, to be a good coating, the coating must be compatible with the surface against which it wears. Actually, if a choice had to be made, it would be preferrable to have the coated part, such as a piston ring, wear more than the mating part since the coated parts are usually more cheaply and easily replaceable.

It might also be theorized that molybdenum carbide particles could be substituted for the tungsten carbide particles in the cobalt matrix in the starting aggregate. However, such does not seem to be the case, apparently because molybdenum carbides do not alloy with the cobalt and other elements in the coating as well as does tungsten carbide. Thus, the tungsten carbide provides a hard alloy phase to provide wear resistence and the pure molybedenum and nickel-molybdenum alloys provide wear resistance, scuff resistance, and lubrication in the final coating. For these reasons, the tungsten carbide-cobalt particles and nickel encapsulated molybdenum particles are preferred as two of the four constituent particles of the starting aggregate.

It should also be appreciated that the minimum and maximum amounts of the constituents in the starting aggregate are difficult to establish since testing is naturally conducted with the object of obtaining the best possible coating. Therefore, as tests are conducted, the results indicate trends from which it can be postulated that the aggregate content of a particular constituent below and above certain amounts will result in unsatisfactory results. However, the preferred amount of a particular constituent will be fairly accurate since it represents the amount that has produced the best coating in a series of tests. Accordingly, the foregoing examples illustrate the preferred content of the various constituents in the starting aggregate and the minimum and maximum amounts that produced results which logically dictate the minimum and maximum amounts that are believed would produce a satisfactory coating.

As an illustration of the invention, the bearing faces of piston rings having a keystone cross-sectional configuration measuring 4.250 × 5/32 inches were degreased in a conventional manner and grit blasted prior to receiving the subsequently applied flame-sprayable aggregate. The aggregate was flame-sprayed onto the bearing faces of the piston rings with a plasma flame gun in a conventional manner. The aggregate contained the following particles in weight percent:

| | |
|---|---|
| NICKEL ENCAPSULATED ALUMINUM (95% NICKEL --- 5% ALUMINUM) | 10.5% |
| NICKEL ENCAPSULATED MOLYBDENUM (45% NICKEL --- 55% MOLYBDENUM) | 30.0% |
| SINTERED TUNGSTEN CARBIDE-COBALT (88% TUNGSTEN CARBIDE --- 12% COBALT) | 35.0% |
| INTERMETALLIC ALLOY (63.9% NICKEL-COBALT) (1.3% CARBON) (5.0% SILICON) (20.0% CHROMIUM) (4.7% BORON) (5.0% IRON) | 24.5% |

The coating on the ring after flame-spraying had a thickness of about 0.012–0.014 inches. This coating was subsequently ground by conventional techniques to a thickness of 0.006–0.008 inches. Twelve rings were tested, two rings per piston.

The rings were placed in a conventional turbocharged wet sleeve diesel engine having a bore measuring 4.250 inches. Conventional lubricants were used. The engine was run for a total of 916 test hours. Subsequently, the rings were removed from the engine, visually examined and the end clearance increase of the piston rings and the diametral bore increase of the cylinder liners were measured.

The end clearance increase of a piston ring is determined by measuring the free end gap of each piston ring while the ring is placed in a gauge having a diameter equal to the diameter of the cylinder. The free end gap of the piston ring is measured before and after engine testing and the difference between these two measurements is taken to determine the end clearance increase of the piston ring.

The diametral bore increase of the cylinder liner is determined by measuring the diameter of the cylinder liners before and after engine testing at the turn around point of the top piston ring and taking the difference between these two measurements. The greatest amount of cylinder wear will occur at the turn around point of the top piston ring.

The average end clearance increase of the twelve piston rings tested was 0.003 inches and the average maximum bore increase of the six cylinder liners at the turn around point of the top piston ring was 0.00013. These measurements indicated that very little ring wear and cylinder liner wear occurred and the coatings on the piston rings were very compatible with the cylinder liners.

Other tests were conducted in a diesel engine running at 2000 R.P.M. and developing 191 B.M.E.P. (brake mean effective pressure) at 430 H.P. using S.A.E. 30 weight lubricating oil in the engine. The cylinder bores included hard cylinder liners at 450–500 B.H.N. (Brinell hardness number). Duration of the tests ranged from 213 to 600 hours.

The coatings tested are listed below by identifying number with the percent weight of the constituents given for each:

| | | |
|---|---|---|
| K-1033A | NICKEL ENCAPSULATED ALUMINUM | 10.5% |
| | NICKEL ENCAPSULATED MOLYBDENUM | 30.0% |
| | SINTERED TUNGSTEN CARBIDE-COBALT | 35.0% |
| | INTERMETALLIC ALLOY | 24.5 |
| K-1045A | NICKEL ENCAPSULATED ALUMINUM | 3.7% |
| | NICKEL ENCAPSULATED MOLYBDENUM | 50.0% |
| | SINTERED TUNGSTEN CARBIDE-COBALT | 37.5% |
| | INTERMETALLIC ALLOY | 8.8% |
| K-1045C | NICKEL ENCAPSULATED ALUMINUM | 3.0% |
| | NICKEL ENCAPSULATED MOLYBDENUM | 60.0% |
| | SINTERED TUNGSTEN CARBIDE-COBALT | 30.0% |
| | INTERMETALLIC ALLOY | 7.0% |

The results of the tests are summarized in the table below which sets forth the coating number, the engine test number, the hours duration of the test, the increase in ring end clearance and increase in cylinder liner diameter in inches at the conclusion of the test.

| COATING NO. | TEST NO. | TEST HOURS | INCREASE-END AT TEST HRS. | CLEARANCE AT 600 HRS. | INCREASE-CYL. AT TEST HRS. | DIAMETER AT 600 HRS. |
| --- | --- | --- | --- | --- | --- | --- |
| K-1033A | 94 | 600.0 | .0015 | .0015 | .00016 | .00016 |
| K-1033A | 95 | 213.3 | .0012 | .0021* | .00024 | .00030* |
| K-1033A | 96 | 457.1 | .0018 | .0021* | .00018 | .00020* |
|  |  |  | Average — — | .0019 | Average — — | .00022 |
| K-1045A | 95 | 213.3 | .0025 | .0035* | .00034 | .00054* |
| K-1045C | 96 | 457.1 | .0029 | .0038* | .00036 | .00044* |

*EXTRAPOLATED VALUES

It can be seen by reference to the test numbers that testing of coatings K-1033A and K-1045A occurred simultaneously in the same engine; similarly, testing of coatings K-1033A and K-1045C occurred simultaneously. In test No. 95 which ran for 213.3 hours and test No. 96 which ran for 457.1 hours, the wear of the coatings and cylinder liners was projected to 600 hours.

On the basis of the foregoing tests, the coating K-1033A was judged to be the best since less ring wear occurred as measured by the increase in end clearance of the rings with much less wear on the cylinder liner as measured by an increase in the diameter of the cylinder liner.

From the foregoing it has been concluded that the preferred amount of nickel encapsulated molybdenum particles in the starting aggregate is about 30% but if the amount exceeds 85% or is less than 26.7%, the resultant coating will wear beyond acceptable commercial limits over a given period of time.

Accordingly, the invention having been described in its best embodiment and mode of operation, that which is desired to be claimed by Letters Patent is:

1. A powder mixture for plasma spraying onto a wear surface of a bearing member comprising by weight:
   0 – 10.5% Ni-Al particles,
      said Ni-Al particles consisting of
      4.5 – 22% elemental aluminum and
      78 – 95.5% elemental nickel;
   26.7 – 85% Ni-Mo particles;
      said Ni-Mo particles consisting of a core of
      40 – 60% elemental molybdenum encapsulated in
      60 – 40% elemental nickel;
   15 – 39% sintered WC-Co particles,
      said sintered particles consisting of a matrix of
      10 – 14% elemental cobalt particles containing
      86 – 90% tungsten carbide particles; and
   0 – 47.8% intermetallic alloy particles,
      said alloy particles consisting of
      63.9 – 77.6% nickel-cobalt alloy of which no more than 1% is cobalt,
      0.6 – 1.3% carbon,
      3.0 – 5.0% silicon,
      13.0 – 20.0% chromium,
      2.75 – 4.75% boron, and
      3.0 – 5.0% iron.

2. The powder mixture of claim 1 wherein said Ni-Al particles consist of a bonded aggregate of
   4.5 – 5.0% elemental aluminum particles and
   95.5 – 95.0% elemental nickel particles 3. The powder mixture of claim 1 wherein the weight percentage of said Ni-Al particles is substantially 10.5%.

4. The powder mixture of claim 1 wherein the weight percentage of said Ni-Mo particles is substantially 30.0%.

5. The powder mixture of claim 1 wherein the weight percentage of said sintered WC-Co particles is substantially 35.0%.

6. The powder mixture of claim 1 wherein the weight percentage of said intermetallic alloy matrix particles is substantially 24.5%.

7. The powder mixture of claim 1 wherein the diameter of the particles of said powder is from 5 to 100 microns.

8. The powder mixture of claim 1 wherein said mixture contains no less than 7.0% and no more than 41.0% elemental nickel by weight.

9. The powder mixture of claim 1 wherein said mixture contains said Ni-Al, Ni-Mo, WC-Co, and intermetallic alloy particles by weight percent within the limits of points A, B, C, and D of FIG. 3.

10. The powder mixture of claim 1 wherein said Ni-Al particles consist of a core of
   18 – 22% elemental aluminum encapsulated in
   78 – 82% elemental nickel.

* * * * *